April 13, 1943.  C. A. SCOTT  2,316,191
SOLAR HEATER
Filed June 29, 1940
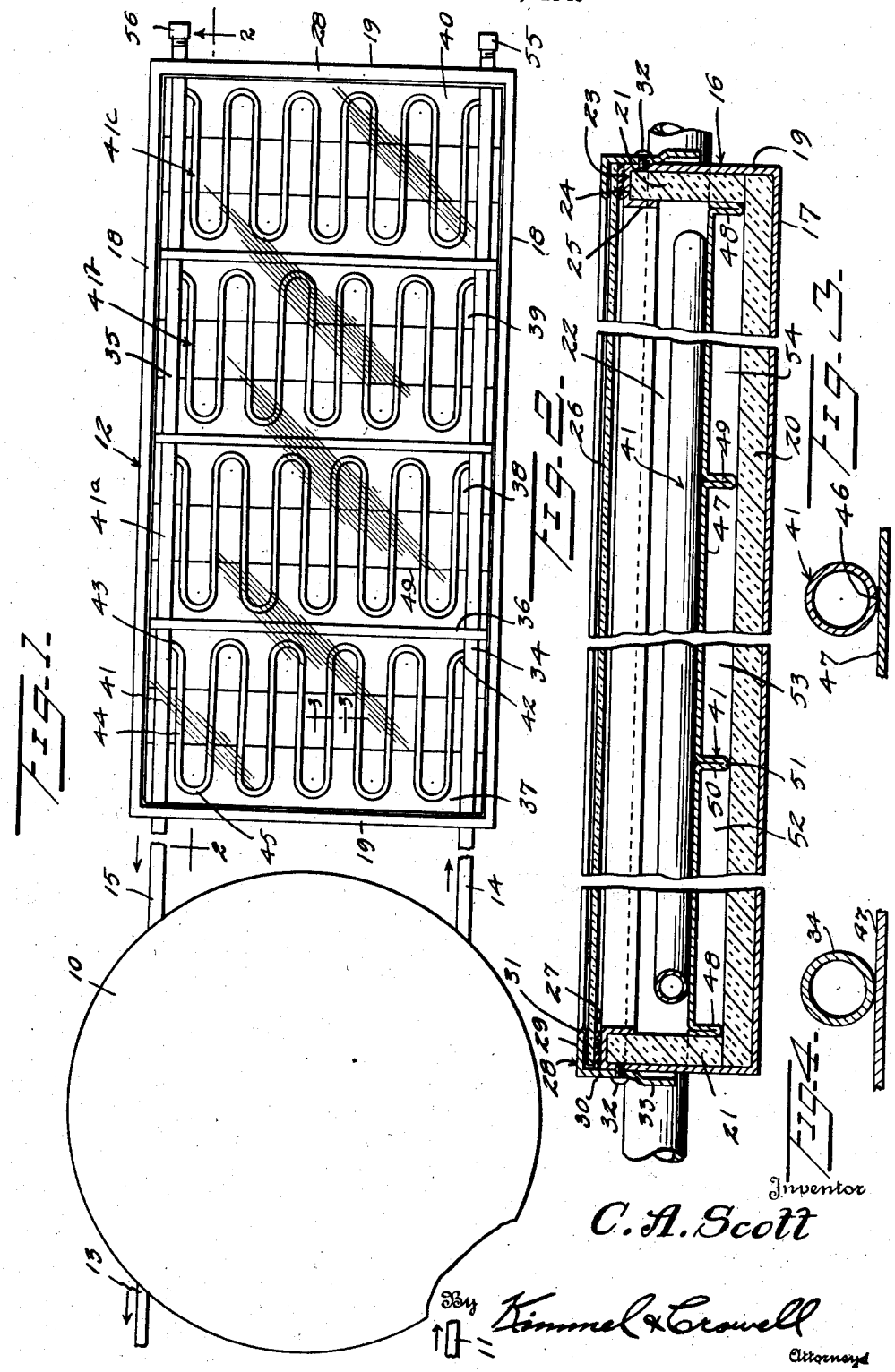

Patented Apr. 13, 1943

2,316,191

UNITED STATES PATENT OFFICE 2,316,191

SOLAR HEATER

Clifton A. Scott, North Miami Beach, Fla., assignor to Sun-Ray Heater Company, North Miami Beach, Fla., a partnership Application June 29, 1940, Serial No. 343,281

2 Claims. (Cl. 126—271)

This invention relates to solar heaters and is an improvement over my copending application, Serial No. 330,215 filed April 17, 1940, for Solar heaters.

An object of this invention is to provide a solar heater formed of a pair of relatively large diameter intake and outlet manifolds and a series of serpentine coils connected to the manifolds, the manifolds being of sufficiently larger diameter than the coils so that each inlet manifold is capable of supplying sufficient water to the coils and each outlet manifold is capable of exhausting the water from the coils by thermal action.

Another object of this invention is to provide a solar heater formed of water heating coils mounted in a heat insulated housing, the coils being mounted upon a heat absorbing metal plate which is of such construction as to form an insulating air space between the bottom of the housing and the plate.

A further object of this invention is to provide a solar heater with a relatively thin heat absorbing plate which is fixed to a water heating coil, the plate being provided with means for not only supporting the plate and the coil in spaced relation to the bottom of the housing, but also for forming non-communicating air chambers which constitute an additional heat insulating means in the housing.

A still further object of this invention is to provide a solar heater with a water heating coil and a heat absorbing inner wall, the inner wall including means integral therewith for supporting the inner wall in spaced parallel relation to the outer wall, and in addition providing a minimum of contact points with the outer wall so as to reduce the heat transfer therebetween.

A further object of this invention is to provide a heater of this type which is capable of producing hot water of a higher temperature in a shorter time than is possible with available heaters of the same type.

A further object of this invention is to provide a heater of this type which may be readily packed for shipment before installation and which will not easily become damaged by rough handling during shipment.

To attain the foregoing objects and others which may hereinafter appear, the invention consists of the novel construction, combination and arrangement of parts as will be more specifically referred to and illustrated in the accompanying drawing wherein are shown embodiments of the invention, but it is to be understood that changes, variations and modifications may be resorted to which fall within the scope of the invention as claimed.

In the drawing:

Figure 1 is a detail top plan partly broken away of a solar heating system constructed according to an embodiment of this invention.

Figure 2 is an enlarged fragmentary sectional view taken on the line 2—2 of Figure 1.

Figure 3 is an enlarged fragmentary sectional view taken on the line 3—3 of Figure 1.

Figure 4 is an enlarged fragmentary detailed sectional view illustrating the manner in which a manifold is secured to the upper face of the heat absorbing plate.

Referring to the drawing, the numeral 10 designates generally a heat insulated storage tank or reservoir which is connected as by a pipe 11 to a source of cold water supply. An outlet hot water pipe 13 leads from the storage tank or reservoir 10 and is adapted to be connected to suitable outlets (not shown) and which may be disposed at selected points in a dwelling or other building. A solar heating member generally designated as 12 is connected to the storage tank 10, being connected at one side by means of an intake pipe 14 and being connected at the opposite side with the storage tank 10 by means of an outlet pipe 15.

The heater 12 comprises a casing 16 formed of a bottom wall 17, side walls 18 and end walls 19. The casing or housing 16 is preferably formed of metal and a heat insulating bottom 20 is disposed within the housing 16 and engages the inner surface of the outer bottom 17. Upstanding heat insulation members 21 are disposed upon the upper end marginal portions of the bottom member 20 and positioned against the inner surfaces of the end walls 19. A pair of upstanding heat insulation members 22 are disposed upon the upper side marginal portions of the bottom member 20 and positioned against the inner faces of the side walls 18. The side walls 18 and the end walls 19 at their upper edges are each formed with a substantially inverted L-shaped flange 23 including a horizontal leg 24 engaging over the upper edges of the side and end members 21, 22 and a vertically disposed leg 25, at the inner side of the leg 24 extending downwardly against the inner faces of the side and end members 21, 22. The flanges 23 secure the members 21, 22 to the walls of the casing and also act to maintain the member 20 upon the bottom 17.

A transparent top wall 26 is positioned over the horizontal legs 24 of the flanges 23 and preferably a cushioning gasket 27 is interposed between the under side of the transparent top wall or panel 26 and the said upper legs 24.

A rectangular retaining or securing member generally indicated at 28 is employed for maintaining the top wall or panel 26 in position over the open top of the casing or housing 16. The member 28 is of frame-like form and its body is of angle-shaped contour in cross section thereby providing a horizontally disposed upper part 29 and a vertically disposed outer part 30 depending from the outer edge of the part 29. The part 29 of member 28 overlies the marginal portion of the wall or panel 26. The part 30 opposes the edges of the wall or panel 26, depends below the latter and is positioned against the upper portion of the outer faces of the side and end walls 18 and 19. The upper part 29 of the panel securing member 28 is formed at its inner edge with a downturned part 31 which is adapted to contact with the upper surface of the panel or wall 26 so as to thereby form a resilient fastening means for resiliently holding the panel or top wall 26 on the upper edge of the housing 16. By providing a resilient holding or clamping means of this kind, the housing 16 and the component parts thereof may be permitted to expand or contract under varying temperatures without cracking or breaking the transparent panel or wall 26. The part 30 of the top wall securing member 28 is secured as by fastening devices 32 to the side and end walls 18 and 19 and preferably the part 30 is formed at its lower edge with an outwardly offset apron or flashing 33 which is outwardly offset from the adjacent face of a side or end wall so as to thereby permit a metal flashing to be inserted between the offset part 33 and the adjacent side and end wall of the housing 16.

An intake manifold 34 is disposed within the housing 16 and extends longitudinally of one side wall 18, being positioned in slightly spaced relation with the adjacent face of a side wall. An outlet or exhaust manifold 35 is disposed closely adjacent the opposite side wall 18 of the housing 16 and is positioned in parallel relation to the intake manifold 34. The intake manifold 34 is connected to the outlet pipe 14 from the storage tank 10 and the outlet manifold 35 is connected to the return pipe 15 which discharges hot water into the storage tank 10. Preferably the interior of the housing 16 is formed with a plurality of transversely disposed parallel spaced partitions 36 which divide the interior of the housing 16 into a plurality of heating chambers 37, 38, 39 and 40. The manifolds 34, 35 extend through said chambers, the partitions 36 and project from the end walls of the casing.

A hot water heating coil 41 is disposed in the heating chamber 37 and is connected at one end as at 42 to the cold water manifold 34. The opposite end of the coil 41 is connected as at 43 to the outlet or hot water manifold 35. The water heating coil 41 in the present instance is constructed in substantially serpentine form with a plurality of parallel stretches 44 which are connected together at one end by means of an arcuate stretch 45. One member 44 of each pair of parallel stretches is connected by an arcuate connecting member 45 to a succeeding stretch 44, the arcuate stretches 45 being alternately disposed as shown in Figure 1 so as to provide a continuous coil of substantial length between the two manifolds 34 and 35.

The heating coil 41 is adapted to be fixed by means of solder 46 or other securing means to a heat absorbing plate 47 which is positioned within the housing 16. The plate 47 constitutes an inner bottom which is disposed in parallel and spaced relation to the insulated bottom member 20 and provides the bottoms of the heating chambers 37, 38, 39 and 40. The plate 47 is constructed of metal, such as copper or the like and the coil 41 is also preferably constructed of similar material. The marginal portions of the plate 47 are bent upon themselves to form depending vertically disposed outer edge supports, reinforcing members or ribs which seat on the member 20 and bear against the lower portions of the inner faces of the members 21 and 22. With reference to Figure 2 the members 48 at the end of the plate 47, which bear against the inner faces of the members 21 are shown. The supports, reinforcing members or ribs 48 will be hereinafter referred to as ribs. The ribs 48 form combined spacing and supporting means for the sides and ends of the plate 47 with respect to the bottom members 20.

The plate 47 is formed with downwardly extending ribs 49 which extend in parallel relation between the opposite sides of the plate 47 and correspond in height to the height of the ribs 48 and these ribs 49 are formed integral with the plate 47. Each rib 49 comprises a pair of parallel face abutting strips 50 which are formed integral with the body of the plate 47 and which are connected together at their lower ends by an arcuate connecting part 51. The ribs 49 as well as the ribs 48, at their lower edges, are adapted to rest on the upper surface of the member 20 and form a supporting means for the intermediate portions of the plate 47 so that this plate may be formed of relatively thin sheet metal. The ribs 48 are of the same form as the ribs 49. The ribs 48, 49 not only support the plate 47 in spaced parallel relation to the bottom wall 20, but also reinforce the plate 47 against bending. In addition to reinforcing and supporting the plate 47, the ribs 49 constitute dividing walls for dividing the air space between the plate 47 and the bottom wall 20 into a plurality of dead air chambers 52, 53 and 54. It will be understood that while there are disclosed two ribs 49 for supporting the plate 47 below each heating chamber, there may be more or less of these ribs depending only on the size of the coil 41 and thickness of the plate 47. The upper surface of the plate 47 and the exterior of the coil 41 is adapted to be coated with a heat absorbing coating such as black material in the form of paint or enamel so that when the sun's rays strike the coil 41 and the plate 47, the heat from the rays will be absorbed by the coil 41 and also by the plate 47.

As shown in Figure 1, there are four coils within the housing 16, these coils being designated 41, 41$^a$, 41$^b$ and 41$^c$. The manifolds 34 and 35 are of sufficiently large diameter with respect to the diameter of each coil 41 so that water may freely flow throughout the length of each manifold and pass from the intake manifold 34 through the several coils into the outlet or hot water manifold 35 under thermal action. In other words, where there are four coils in a housing, the intake and outlet manifolds will have a capacity substantially equal to four times the capacity of one coil.

The manifolds 34 and 35 as shown in Figure 1 are extended through one of the end walls 19 and the ends of these manifolds may be closed by caps 55 and 56, respectively. By extending the manifolds 34 and 35 through the adjacent end of the housing 16, additional heating units may be coupled with the manifolds for discharge into the storage tank 10. It will also be understood that if desired, the pipes 14 and 15 may be connected to the ends of the manifolds 34 and 35 which have the caps 55 and 56 mounted thereon.

In the use and operation of this solar heating means, a heater 12 is adapted to be positioned on the exterior of a building in a position to receive the sun's rays. The storage tank 10 may be positioned remote from the heater 12 and may be positioned in the interior of a building at any suitable point. The pipe 11 will maintain the storage tank 10 filled at all times and place the water in this tank under the desired pressure. When the sun's rays strike the transparent top wall 26, the rays will pass through this transparent wall and contact with the heating coils 41 and also with the heat absorbing inner bottom wall formed by the plate 47. The water in the manifolds 34 and 35 and the water in the several coils will be heated by absorption of heat from the coils and from the inner bottom 47 and the effect of the heating of the water will be to establish a thermal siphon action for forcing the heated water through the outlet pipe 15 into the storage tank 10.

Through the provision of the inner bottom provided by the plate 47 which is of heat absorbing capacity, a dead air space will be provided between this bottom 47 and the insulated bottom 20. In this manner the temperature of the insulated bottom 20 and the outer bottom 17 will not materially affect the temperature of the inner bottom 47 particularly during the initial contact of the inner bottom 47 with the sun's rays. In this manner the heater hereinbefore described will produce heated water more quickly than is possible wherein the coil contacts at all points with the insulated bottom or where there is no dead air space to insulate the heat absorbing inner bottom from the insulated bottom of the housing.

Furthermore, by the provision of the narrow supporting reinforcing ribs 49, the plate is in heat exchanging relation with the insulated bottom along a very small edge so that the temperature of the insulated bottom 20 will not materially affect the temperature of the inner heat absorbing bottom 47. A solar heater constructed according to this invention will heat a given quantity of water more quickly than heaters at present available and in addition will heat the water to a higher degree for a given period of time than heaters of a similar type. By securing each coil 41 and each manifold 34 and 35 directly to the heat absorbing plate 47, the coils 41 and the manifolds 34 and 35 will also reinforce the inner bottom 47 and in addition the attachment of the coils and manifolds to the inner bottom by solder or other permanent fastening means, the unit will be stronger so that it will withstand harder usage during the shipment of the unit to the point of installation than the devices at present available.

What I claim is:

1. In a solar heater having an open top casing formed of bottom, side, and end walls, and a closure for the casing provided with a transparent panel, the combination of a bottom member of insulating material seated on the casing bottom and bearing against the inner faces of the casing walls, upstanding members of insulating material seated on said bottom member and bearing against the inner faces of the casing side and end walls, means for securing said upstanding members to said casing side and end walls and on said bottom walls, said means comprising an integral flange portion bent at right angles from the top peripheral edge of said side and end walls and a depending flange portion bent at right angles from the inner edge of said first named flange portion, said walls and said flange portions forming a U-shaped member which encloses the upper edge of said upstanding members, an imperforate heat conducting plate disposed within the casing below the top of the latter and above said bottom member and bearing against said upstanding members, said plate having a substantially smooth upper face and having depending vertically disposed spaced parallel ribs seating on said bottom member, said plates, ribs, and bottom member defining closed spaces disposed in parallel relation below said plate, partitions coacting with said upstanding members and plate to form parallel heating chambers, water heating tubes each positioned within a heating chamber and having its bottom secured to the upper face of said plate, a cold water manifold extending through said casing end walls and said chambers in proximity to a side wall of the casing, and a hot water manifold extending through said casing end walls and said chambers in proximity to the other side wall of the casing, said manifolds being secured upon said plate and connected to each of said tubes.

2. In a solar heater having an open top casing formed of bottom, side, and end walls, and a closure for the casing provided with a transparent panel, the combination of a bottom member of insulating material seated on the casing bottom and bearing against the inner faces of the casing walls, upstanding members of insulating material seated on said bottom member and bearing against the inner faces of the casing walls, means for securing said upstanding members to said casing side and end walls and on said bottom walls, an imperforate heat conducting plate disposed within the casing below the top of the latter and above said bottom member and bearing against said upstanding members, said plate having a substantially smooth upper face and having depending vertically disposed spaced parallel ribs seating on said bottom member, said plates, ribs, and bottom member defining closed spaces disposed in parallel relation below said plate, partitions coacting with said upstanding members and plate to form parallel heating chambers, water heating tubes each positioned within a heating chamber and having its bottom secured to the upper face of said plate, a cold water manifold extending through said casing end walls and said chambers in proximity to a side wall of the casing, and a hot water manifold extending through said casing end walls and said chambers in proximity to the other side wall of the casing, said manifolds being secured upon said plate and connected to each of said tubes.

CLIFTON A. SCOTT.